(12) United States Patent
Kim

(10) Patent No.: US 7,333,804 B2
(45) Date of Patent: Feb. 19, 2008

(54) MESSAGE TRANSMITTING SCHEME OF MOBILE TERMINAL

(75) Inventor: Yong-Sik Kim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 69 days.

(21) Appl. No.: 10/900,341

(22) Filed: Jul. 28, 2004

(65) Prior Publication Data

US 2005/0143104 A1    Jun. 30, 2005

(30) Foreign Application Priority Data

Dec. 27, 2003    (KR)    ...................... 10-2003-0098174

(51) Int. Cl.
*H04Q 7/20*    (2006.01)
(52) U.S. Cl. ............................... 455/414.4; 455/414.1; 455/466
(58) Field of Classification Search ............. 455/412.1, 455/403, 414.1, 417, 432.3, 445, 466, 552.1, 455/414.4, 434, 407, 404.1, 456.1, 566; 379/900, 379/908, 88.13–23; 707/1, 3, 2, 5, 100, 10, 707/102, 7; 715/700, 764, 781, 784
See application file for complete search history.

(56) References Cited

U.S. PATENT DOCUMENTS

| | | | | |
|---|---|---|---|---|
| 5,838,768 | A | * | 11/1998 | Sumar et al. ............. 379/88.14 |
| 5,848,415 | A | * | 12/1998 | Guck ........................... 707/10 |
| 6,151,507 | A | | 11/2000 | Laiho et al. ................. 455/466 |
| 6,904,131 | B2 | * | 6/2005 | Weksel ..................... 379/88.14 |
| 6,978,316 | B2 | * | 12/2005 | Ghaffar et al. .............. 709/246 |
| 7,027,808 | B2 | * | 4/2006 | Wesby ......................... 455/419 |
| 2003/0142364 | A1 | * | 7/2003 | Goldstone .................... 358/402 |
| 2004/0044647 | A1 | * | 3/2004 | Salmenkaita .................... 707/1 |
| 2004/0162076 | A1 | * | 8/2004 | Chowdry et al. ........... 455/445 |
| 2004/0185883 | A1 | * | 9/2004 | Rukman ...................... 455/466 |
| 2004/0203956 | A1 | * | 10/2004 | Tsampalis .................... 455/466 |
| 2004/0266411 | A1 | * | 12/2004 | Galicia et al. ........... 455/414.4 |
| 2005/0009541 | A1 | * | 1/2005 | Ye et al. ..................... 455/466 |
| 2005/0020250 | A1 | * | 1/2005 | Chaddha et al. ......... 455/414.1 |
| 2005/0064883 | A1 | * | 3/2005 | Heck et al. ................. 455/466 |
| 2005/0170855 | A1 | * | 8/2005 | Comer et al. ............... 455/466 |

FOREIGN PATENT DOCUMENTS

| KR | 010061687 | 7/2001 |
|---|---|---|
| KR | 1020020063376 | 8/2002 |

* cited by examiner

*Primary Examiner*—Jean Gelin
(74) *Attorney, Agent, or Firm*—Ked & Associates, LLP

(57) ABSTRACT

A system and method for controlling a mobile terminal transmits collectively messages in different formats, such as LMS and SMS. The message transmission mode is designated by recipient numbers and content is input based on a corresponding message transmission mode. A message can be transmitted to multiple destinations regardless of whether the receiver terminals are able to receive LMS format messages and regardless of whether the receiver terminals are manufactured by different mobile communication providers. In addition, the hardware of the mobile terminal does not need to be re-designed, since the mobile terminal can be implemented simply changing existing software.

46 Claims, 4 Drawing Sheets

MESSAGE TRANSMITTING SCHEME OF MOBILE TERMINAL

BACKGROUND OF THE INVENTION

1. Field of the Invention

The present invention generally relates to a mobile communication system, and more particularly to a message transmitting scheme of a mobile terminal.

2. Background of the Related Art

Traditional mobile phones (e.g., terminals, handsets, user equipment (UE), etc.) employ a simple short message service (SMS) function that transmits a short message to only one party (one destination). Recently, multiple-destination transmission techniques have been developed which support 1:N transmission (N being the total number of destinations) and a long message service (LMS). Through these techniques, it is possible to transmit lengthy messages or multimedia messages to several terminals (destinations) simultaneously. For example, MMS (multimedia message service) provides the ability to send messages comprising a combination of text, sounds, images, and video to MMS capable mobile terminals.

A multimedia message having a large quantity of data (such as pictures, video or music) which cannot be transmitted by the SMS, can be transmitted at one time to a mobile terminal through the LMS. The LMS also provides a function of transmitting and receiving diverse multimedia information (such as e-mails, pictures, music, video information or the like, used in wired (fixed-line) Internet communications) to and from mobile phone subscribers.

FIG. 1 is a flow chart of a related art method of transmitting a multiple-destination message. In this method, a user sets a multiple-destination transmission feature (step S10) and creates a message (step S20). After the message is completed, a terminal determines whether multimedia data has been added to the message or whether the message is considered to be lengthy (step S30). If multimedia data has been added or the message is lengthy, the terminal performs an LMS or MMS multiple-destination transmission (step S40). Otherwise, the terminal performs an SMS multiple-destination transmission.

In the related-art multiple-destination message transmitting method, only the content inputted in transmitting the multiple-destination message is analyzed and then collectively transmitted as an SMS or an LMS to every recipient's phone number.

However, the related art LMS message transmission is only possible between the newest-type terminals that support such pertinent functions. When an LMS message is intended to be transmitted to multiple destinations, the message cannot be transmitted to older-type terminals which do not support the LMS function. Accordingly, in the related art, multiple-destination transmission of a message, since messages of different types (SMS or LMS) for each recipient's phone number cannot be sent, a user must separately send messages several times depending upon whether each intended recipient user has a new-model terminal or an old-model terminal.

In addition, the related-art method provides no solutions for diverse situations demanded by users such as providing service options according to the recipients' numbers, i.e., providing a receive confirmation or read confirmation function for a transmitted message to some but not all recipients (i.e., all multiple destinations), or allowing the sending of e-mail (instead of a message) to specific recipients. These limitations of the related art cause inconvenience to users.

SUMMARY OF THE INVENTION

An object of the invention is to solve at least the above problems and/or disadvantages and to provide at least the advantages described hereinafter.

Another object of the present invention is to provide a system and method for transmitting messages from a mobile terminal where messages in a form compatible with different types for each recipients' number to multiple destinations.

Another object of the present invention is to provide a system and method for transmitting messages from a mobile terminal in a form compatible with each recipients' mobile terminal, and which provides options of each service desired by a caller (sender) employing multiple-destination transmission.

To achieve these and other objects and advantages, the present invention provides a message transmitting scheme of a mobile terminal including: a step in which a user sets a multiple-destination message and designates recipients' numbers and sets formats and options suitable for the designated recipients' numbers; a step in which a message to be transmitted is created by discriminating the formats; and a step in which the created message is transmitted to multiple destinations. Preferably, the format is an SMS or an LMS and discriminatively stored in a storage field according to a tele-service identifier. Also, the option is preferably a receive confirmation or read confirmation function on the transmitted message.

DETAILED DESCRIPTION OF PREFERRED EMBODIMENTS

Figure 1:
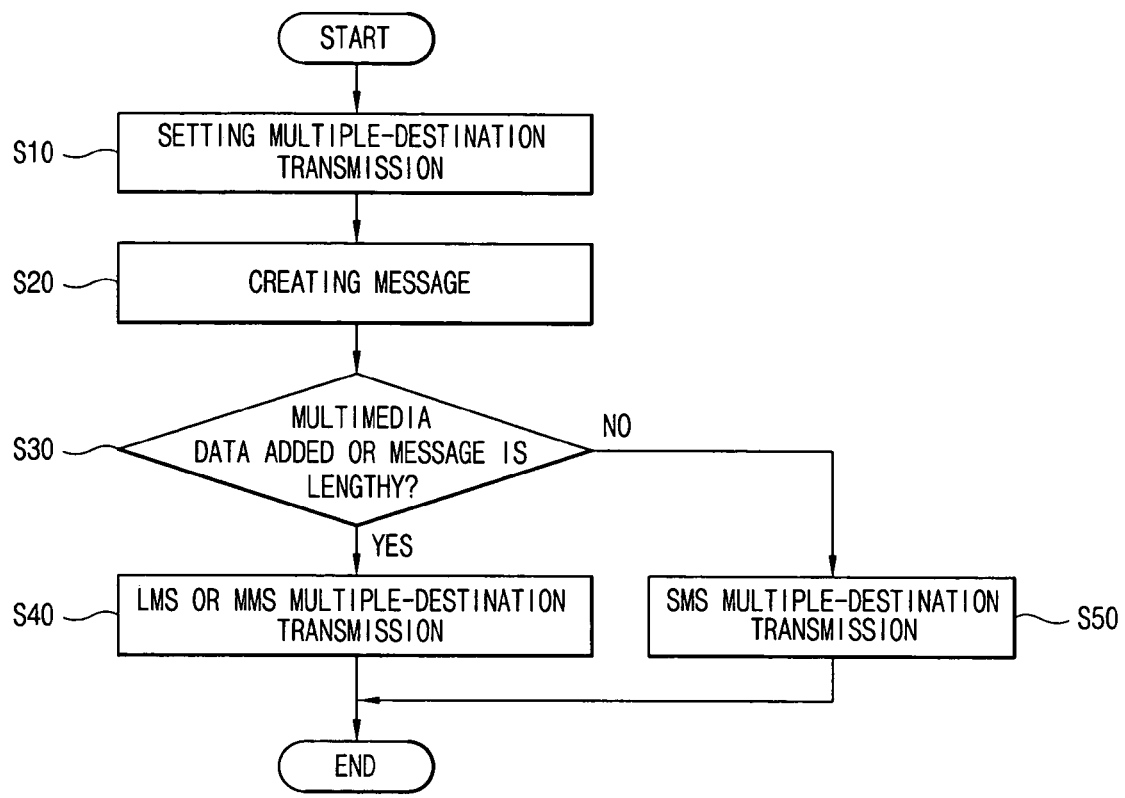
FIG. 1 is a flow chart of a related-art process of transmitting a message to multiple destinations.
Figure 2A:
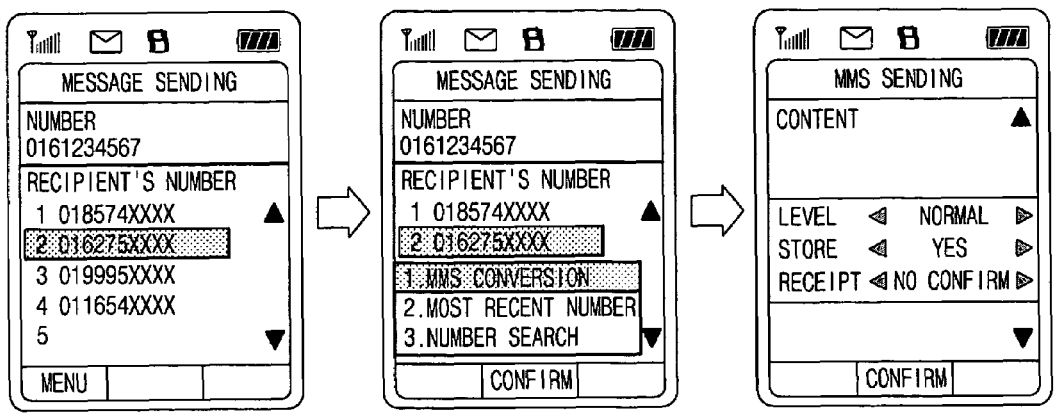
FIGS. 2A and 2B illustrate a process of setting message formats for each recipient's number in accordance with a preferred embodiment of the present invention.
Figure 2B:
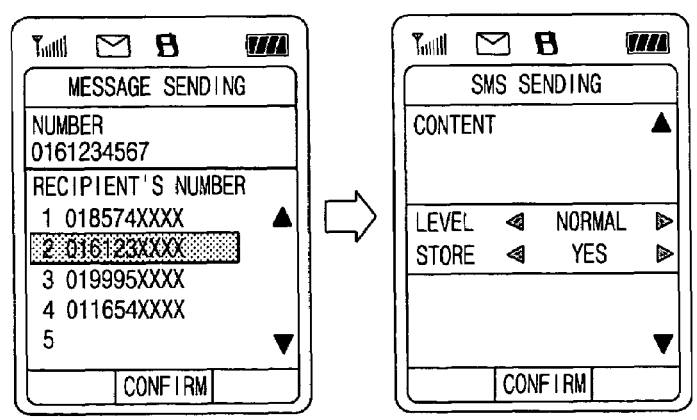

FIGS. 2A and 2B illustrate a method of setting message formats for each of a plurality of recipient numbers in accordance with a preferred embodiment of the present invention. First, a user designates a message transmission service according to the recipients' numbers. In other words, as shown in FIG. 2A, if a MMS message is intended to be transmitted only to a specific phone number, e.g., 016-275-XXXX, the user moves a cursor to the number and sets a MMS (Multimedia Message Service) conversion feature in a pop-up menu displayed on the screen of the terminal. In this case, if the user simply selects 'confirm' without performing MMS conversion, the format is set as an SMS message. Namely, the message format default is set as SMS.

When the MMS conversion is set by the user, a window for setting an option of a corresponding message is displayed on the screen of the terminal, so that the user can set various options such as a receive confirmation or read confirmation function or an importance level (priority) of the message to be sent.

After the MMS message has been completely created, the user may want to transmit a different format of the same message, e.g., a short message service (SMS) message, to a different phone number. In this case, as shown in FIG. 2B, the user can select the desired new phone number and selectively set any desired options provided by the menus. Thus, as mentioned above, in the present invention, when a multiple-destination message is transmitted, different message transmission formats (MMS or SMS) can be designated for sending to each recipient's number (e.g., phone number, e-mail, etc.).

The present invention also provides a method for simultaneously transmitting a multiple-destination message in various message transmission formats designated to be different for each recipient's number. For this purpose, an LMS field is added to a storage field for each recipient's number in a phone book feature of the mobile terminal to allow different message formats (SMS and LMS) to be stored according to the recipients' numbers (e.g., phone number, e-mail, etc.). Namely, in the present invention buffers for discriminatively storing the SMS and LMS are employed in the storage field to allow storing of different message formats according to phone numbers (or e-mail addresses), so that different format messages can be specified during inputting of the message content and subsequent sending thereof.

By doing so, the LMS buffer and SMS buffer are managed together. The reason for managing the buffer for the LMS is because, generally, the LMS requires an encoding procedure unlike SMS. In particular, SMS messages and LMS messages need to be separately stored after sending of the messages.

After the recipient's number (e.g., phone number, e-mail, etc.) and the message content are completely input, the message is transmitted preferably through a two-step procedure. Namely, the SMS message and LMS message are separately transmitted according to the multiple-destination transmission fields. For example, the SMS multiple-destination transmission can be first performed and then the LMS multiple-destination transmission can be performed. Or, the LMS multiple-destination transmission can be first performed and then the SMS multiple-destination transmission can be performed.

The terminal discriminates and transmits the LMS message and the SMS message in turn, and the SMS message may be repeatedly transmitted to a plurality of recipients. Although the message to be sent to multiple recipients using different message formats is not transmitted simultaneously, from the sender's point of view an indication such as 'message is being transmitted' may be displayed on the screen so the sender may consider the message transmission to be a single multiple-destination transmission.

Figure 3:
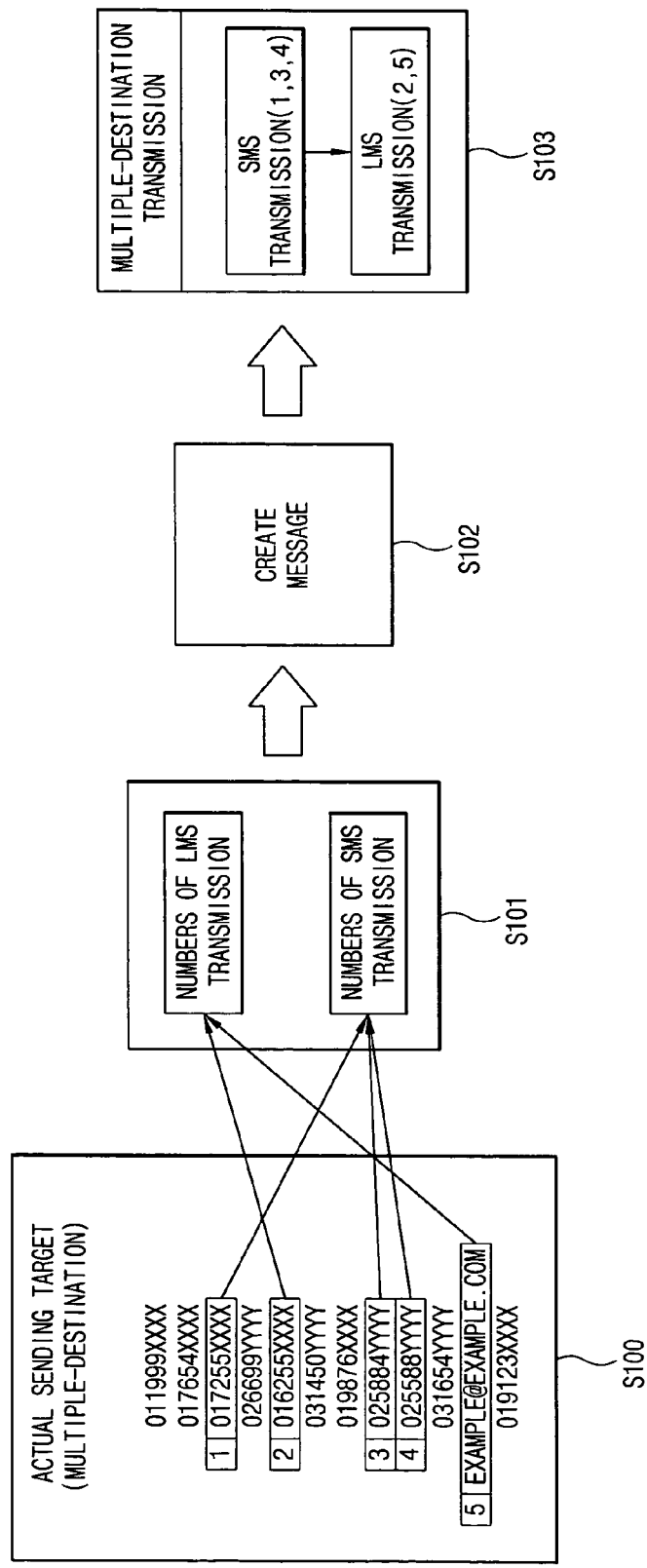
FIG. 3 illustrates a process of transmitting an entire message by recipients' numbers in accordance with the preferred embodiment of the present invention.

FIG. 3 illustrates a process of transmitting an entire message according to the recipients' numbers (e.g., phone number, e-mail, etc.) in accordance with the preferred embodiment of the present invention.

Initially, the user designates two or more recipients' numbers (e.g., phone numbers or e-mail addresses) to which a multiple-destination message transmission is intended, sets the formats of the LMS and the SMS according to the designated recipients' numbers, and then selectively sets any desired options (step S100).

The terminal employs different identities (e.g., tele-service identifiers) and stores the set message formats in the storage fields for each designated recipient's phone number (step S101).

Thereafter, the user inputs the message content according to the formats (SMS and LMS) to be transmitted (step S102). When the user selects the transmission feature, the terminal transmits the SMS message and LMS message through a two-step procedure according to the information classified in the fields (step S103).

Consider, for instance, the core where the user (sender) designates four recipients' phone numbers such as (1) 017255XXXX, (2) 016255XXXX, (3) 025884YYYY, (4) 025588YYYY and one e-mail address of (5) example@example.com. The user may only select 0162558874 (2) and e-mail Address example@example.com (5) or ones available for receiving LMS format messages, by setting an LMS message conversion option. The user may also select items (1), (3) and (4), which are not capable of receiving LMS format messages, as recipients for SMS format messages.

Thereafter, the user (sender) creates a message to be transmitted in LMS format and a message to be transmitted in SMS format by discriminating the formats and selecting a transmission feature for sending. Then, the terminal discriminatively transmits the LMS message and SMS message to their appropriate multiple destinations.

Figure 4:
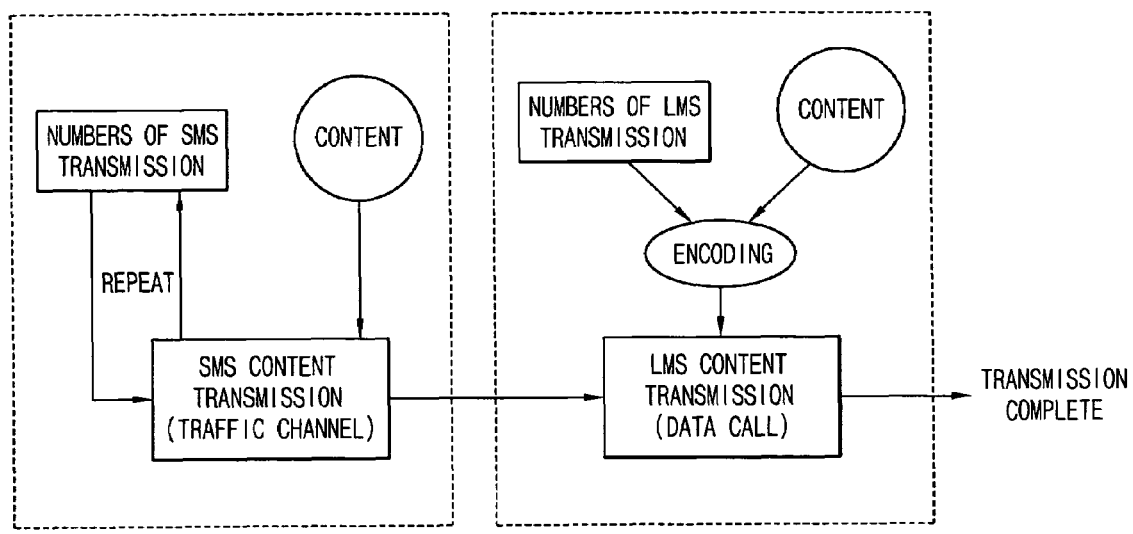
FIG. 4 illustrates a detailed process for simultaneous transmission of an SMS and an LMS message in accordance with the preferred embodiment of the present invention.

FIG. 4 illustrates a process of transmitting SMS and LMS messages in accordance with the preferred embodiment of the present invention. Unlike the SMS multiple-destination transmission scheme (410), LMS multiple-destination transmission scheme (420) does not require repeated transmission of the same message to multiple recipients. Instead, the destination information of multiple recipients are encoded together with separators to distinguish each destination (recipient) to allow the message to be sent to multiple recipients by a single transmission. Here, the separator may be a semicolon (;) or another type of code symbol such as a colon (:), a comma (,), a couple of turned commas (' '), an arrow (▶), a clover (♣), etc.

In case of the SMS, multiple-destination transmission may require repeated transmission of the same message to multiple recipients. Comparatively, in case of the LMS multiple-destination transmission, a single message can be encoded in the form of, for example, "recipient's number 1; recipient's number 2; recipient's number 3; . . . " to allow the message to be "simultaneously" transmitted to the multiple recipients. Typically, the SMS message is transmitted through a general traffic channel while the LMS message is transmitted through a data call that allows high-speed data transmission.

Figure 5:
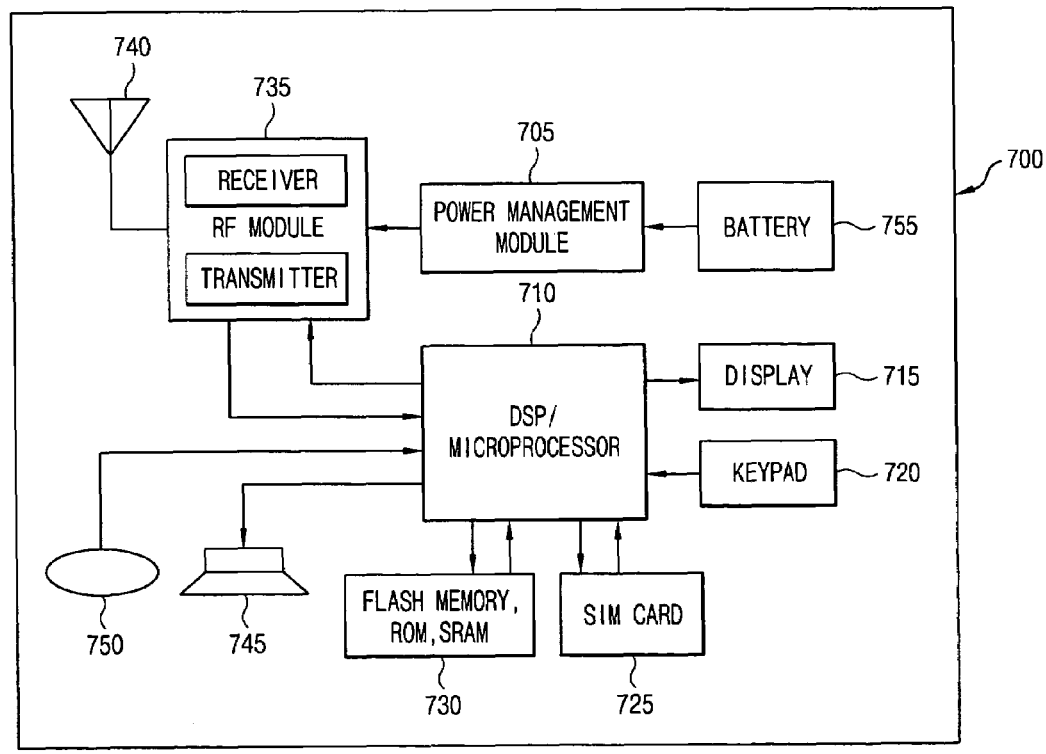
FIG. 5 illustrates a block diagram of a mobile terminal according to the preferred embodiment of the present invention.

FIG. 5 shows a mobile terminal according to the preferred embodiment of the present invention. The mobile terminal 700 comprises a processor (or digital signal processor) 710, RF module 735, power management module 705, antenna 740, battery 755, display 715, keypad 720, memory 730, SIM card 725 (which may be optional), speaker 745 and microphone 750.

In operation, a user enters instructional information, such as a telephone number, for example, by pushing the buttons of keypad 720 or by voice activation using microphone 750. The processor 710 receives and processes the instructional information to perform the appropriate function, such as to dial the telephone number. Operational data may be retrieved from the Subscriber Identity Module (SIM) card 725 or the memory module 730 to perform the function.

Furthermore, the processor may display the instructional and operational information on display 715 for the user's reference and convenience.

The processor issues instructional information to the RF module 735 to initiate communication, for example, by transmitting radio signals comprising voice communication data. The RF module comprises a receiver and a transmitter to receive and transmit radio signals. An antenna 740 facilitates the transmission and reception of radio signals. Upon receiving radio signals, the RF module may forward and convert the signals to base-band frequency for processing by the processor. The processed signals would be transformed into audible or readable information output via the speaker 745 or display 715.

As such, the present invention provides a mobile terminal apparatus for wireless communications. The apparatus includes: a selector to allow a user to select a particular format of a message to be transmitted, among multiple message formats comprising a LMS (long messaging service) format and a SMS (short messaging service) format; an input device to allow the user to create the message to be transmitted according to the selected message format; a processor to process the created message and output a processed message according to the selected message format; and a transmitter to transmit the processed message to a destination. The selector can be implemented in software executed by the processor, and the selector provides a user menu with selectable options. Also, the LMS format can support MMS (multimedia messaging service).

Additionally, the processor can include an encoder to encode the created message if the selected message format requires encoding. The processed message output by the processor is either an encoded message or a non-encoded message. Here, the encoded message pertains to a LMS (long messaging service), and the non-encoded message pertains to a SMS (short messaging service). Also, the encoding by the processor allows a single message to be sent to multiple destinations, by encoding all destination information together with separators to distinguish each destination.

The message transmitting method of a mobile terminal therefore has at least the following advantages. For example, a message transmission mode is designated according to the recipients' numbers and the message content is input according to a corresponding message transmission mode. Thus, a message can be transmitted to multiple destinations regardless of whether the recipient's terminal can or cannot support the LMS or whether the recipient's terminal is of a different mobile telecommunications provider. As a result, the users' convenience can be substantially increased.

In addition, a mobile phone implementing the invention does not need or requires only minimal re-design in hardware, as the mobile phone can be implemented with the present invention simply using new software or updating existing software. Thus allows easy application and generalization.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A message transmitting method of a mobile terminal, comprising:
   receiving information designating different formats of a message;
   receiving content of the message;
   converting the message into the different formats within the mobile terminal; and
   transmitting the message as converted into the different formats from the mobile terminal to a plurality of receiver terminals, wherein the different formats include at least two of a short message type, a long message type, a multimedia message type, or an e-mail type.

2. The method of claim 1, wherein the different message formats include the short message type and the long message type.

3. The method of claim 2, wherein the long message type includes an MMS format.

4. The method of claim 1, further comprising:
   receiving information designating an option to be used to send the message to each of the receiver terminals, wherein the option is at least one of a receive confirmation and read confirmation function to be performed for the transmitted message.

5. The method of claim 1, wherein, in transmitting the message, SMS multiple-destination transmission and LMS multiple-destination transmission are separately performed using multiple-destination transmission fields.

6. The method of claim 5, wherein the SMS multiple-destination transmission is performed through a general traffic channel.

7. The method of claim 5, wherein the SMS multiple-destination transmission is repeatedly performed a number of times equal to the number of receiver terminals.

8. The method of claim 5, wherein LMS multiple-destination transmission is performed through a data call.

9. The method of claim 5, further comprising:
   in LMS multiple-destination transmission, encoding destination information of the plurality of receiver terminals together with a separator symbol; and
   collectively transmitting the message based on the encoded destination information.

10. The method of claim 1, wherein the different formats of the message are designated based on the destination information of the receiver terminals.

11. The method of claim 10, wherein the destination information includes a phone number or an e-mail address.

12. The method of claim 1, wherein transmission of the message to the receiver terminals is recognized as one message transmission process by a user.

13. The method of claim 1, wherein transmitting includes:
   transmitting the message in a single transmission to the receiver terminals designated to correspond to the long message format.

14. The method of claim 1, wherein the different formats of the message are separately stored within at least one memory of the mobile terminal.

15. A message transmitting method for a mobile terminal, comprising:
   adding a long message field, a multimedia message field, and an e-mail field to each of a plurality of recipient numbers to discriminate short message, long message, multimedia message, and e-mail based on the numbers; and
   transmitting a message to the recipient numbers after content input is completed, said transmitting including:

dividing transmission of the message in short message type, long message type, multimedia message type, and e-mail type by multiple-destination transmission fields;
performing a short message multiple-destination transmission;
performing a long message multiple-destination transmission;
performing a multimedia message multiple-destination transmission; and
performing an e-mail multiple-destination transmission.

16. The method of claim 15, wherein the long message includes an MMS.

17. The method of claim 15, wherein transmission of the message in short message and long message formats are discriminated by a tele-service identifier stored in storage fields associated with the recipient numbers.

18. The method of claim 15, wherein the message is transmitted based on a set option, which includes at least one of a receive confirmation and read confirmation function for the transmitted message.

19. The method of claim 15, wherein the short message multiple-destination transmission is performed through a general traffic channel.

20. The method of claim 15, wherein the short message multiple-destination transmission is repeatedly performed a number of times equal to the number of the recipients' numbers.

21. The method of claim 15, wherein the long message multiple-destination transmission is performed through a data call.

22. The method of claim 15, wherein, in the long message multiple-destination transmission, the message is transmitted at one time as the recipient numbers are encoded together with separator symbols.

23. The method of claim 15, wherein transmitting the message is performed by a procedure which is recognized as one message transmission process by a user.

24. The method of claim 15, wherein the recipients' numbers include at least one phone number and at least an e-mail address.

25. The method of claim 15, wherein LMS multiple-destination transmission is performed before short message multiple-destination transmission.

26. A message transmitting method of a mobile terminal, comprising:
designating a plurality of recipient numbers for multiple-destination transmission;
receiving information designating short message, long message, multimedia message, and e-mail transmission formats for the recipient numbers;
discriminately storing in the terminal information indicating short message, long message, multimedia message, and e-mail formats in storage fields of the recipient numbers;
receiving content of a message; and
transmitting the message to die recipient numbers based on the discriminated fields, said transmitting including:
dividing transmission of the message in short message, long message, multimedia message, and e-mail formats by multiple-destination transmission fields,
performing a short message multiple-destination transmission,
performing a long message multiple-destination transmission,
performing a multimedia multiple-destination transmission, and
performing an e-mail message multiple-destination transmission.

27. The method of claim 26, wherein the recipient numbers include at least one telephone number and at least one e-mail address.

28. The method of claim 26, further comprising:
setting an option indicating that at least one of a receive confirmation and read confirmation function is to be performed for the transmitted message.

29. The method of claim 26, wherein the short message multiple-destination transmission is performed through a general traffic channel.

30. The method of claim 26, wherein the short message multiple-destination transmission is repeatedly performed a number of times equal to a number of the recipient numbers.

31. The method of claim 26, wherein the long message multiple-destination transmission is performed through a data call.

32. The method of claim 26, wherein, in the long message multiple-destination transmission, the message is transmitted at one time as the recipients' numbers are encoded together with separator symbols.

33. The method of claim 26, wherein transmission of the short message and long message are recognized as one message transmission process by a user.

34. The method of claim 26, wherein long message multiple-destination transmission is performed before short message multiple-destination transmission.

35. A mobile terminal apparatus for wireless communications, comprising:
a selector to allow a user to select a particular format of a message to be transmitted, among multiple message formats comprising a long message format, a short message format, a multimedia message format, and an e-mail format;
an input device to allow the user to create the message to be transmitted according to the selected message format;
a processor to process the created message and output a processed message according to the selected message format; and
a transmitter to transmit the processed message to a plurality of receiver terminals in said long message, short message, multimedia message, and e-mail format, wherein the processor includes an encoder to encode the created message if the selected message format requires encoding, and the processed message output by the processor is either an encoded message or a non-encoded message.

36. The apparatus of claim 35, wherein the selector is implemented in software executed by the processor.

37. The apparatus of claim 35, wherein the selector provides display of a user menu with selectable options.

38. The apparatus of claim 35, wherein the long message format supports a MMS (multimedia messaging service).

39. The apparatus of claim 35, wherein the encoded message corresponds to the long message format.

40. The apparatus of claim 35, wherein the non-encoded message corresponds to the short message format.

41. The apparatus of claim 35, wherein the encoding by the processor allows a single message to be sent to multiple destinations by encoding all destination information together with separators to distinguish each destination.

42. A message transmitting method of a mobile terminal, comprising:
receiving information designating different formats of a message;

receiving content of the message; and transmitting the message to a plurality of receiver terminals in the different formats, wherein the different formats include at least two of a short message type, a long message type, a multimedia message type, or an e-mail type, said method further comprising:

pre-storing format information for at least one of the receiver terminals, wherein the message is transmitted to said at least one receiver terminal based on the pre-stored format information, said format information retrieved based on selection of destination information associated with said at least one receiver terminal.

43. A message transmitting method of a mobile terminal, comprising:

receiving information designating different formats of a message;

receiving content of the message; and transmitting the message to a plurality of receiver terminals in the different formats, wherein the different formats include at least two of a short message type, a long message type, a multimedia message type, or an e-mail type, said method further comprising:

displaying a list of destination numbers for the receiver terminals;

receiving selection of one of the numbers; and displaying a first menu in response to said selection, the first menu providing a user with an option to select at least one of the different formats of the message.

44. The method of claim 43, wherein said information designates one of the different formats of the message indicated in the first menu.

45. The method of claim 43, further comprising:

displaying a second menu in response to selection of one of the different formats in the first menu, the second menu include a number of options corresponding to a service to be performed for message transmission.

46. The method of claim 45, wherein the service includes at least one of a received message confirmation or a read message confirmation.

* * * * *